United States Patent [19]

Zuckschwert et al.

[11] 3,934,841
[45] Jan. 27, 1976

[54] TAPE DRIVE

[75] Inventors: Edgar Zuckschwert; Georg Friedrich Papst, both of St. Georgen, Germany

[73] Assignee: Papst-Motoren KG, St. Georgen, Germany

[22] Filed: Dec. 2, 1974

[21] Appl. No.: 528,648

[30] Foreign Application Priority Data

Dec. 11, 1973 Germany............................ 2361573

[52] U.S. Cl. ................................. 242/198; 360/96
[51] Int. Cl.² ...................... G03B 1/04; G11B 15/32; G11B 23/04
[58] Field of Search ........................... 242/198–200; 360/96

[56] References Cited
UNITED STATES PATENTS 3,514,050   5/1970   Yamamoto et al. ................. 242/198
3,748,988   7/1973   Downey .............................. 242/198
3,832,734   8/1974   Childress, Jr. et al. ............... 360/96

*Primary Examiner*—Leonard D. Christian
*Attorney, Agent, or Firm*—James C. Wray

[57] ABSTRACT

A tape drive system for a cassette tape recording and/or reproducing apparatus has at least three drive motors, two for driving the tape spools and at least a third for driving a tape drive capstan. two of the motors are disposed so as to engage the cassette from one side thereof, while the other motor or motors is or are disposed so as to engage the cassette from the other side. The motor or motors at a first side of the cassette is or are disposed in a main housing, while the other motor or motors at the second side of the cassette is or are in a casing portion that is pivotable or linearly displaceable relative to the main housing, for insertion or removal of a cassette. The apparatus can have a dual capstan tape drive.

11 Claims, 7 Drawing Figures

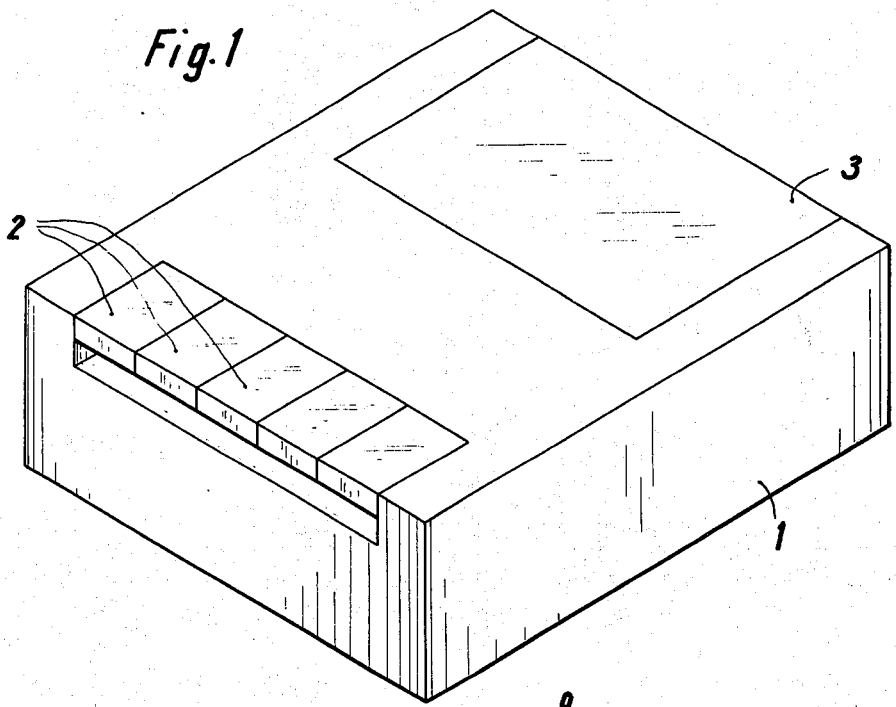
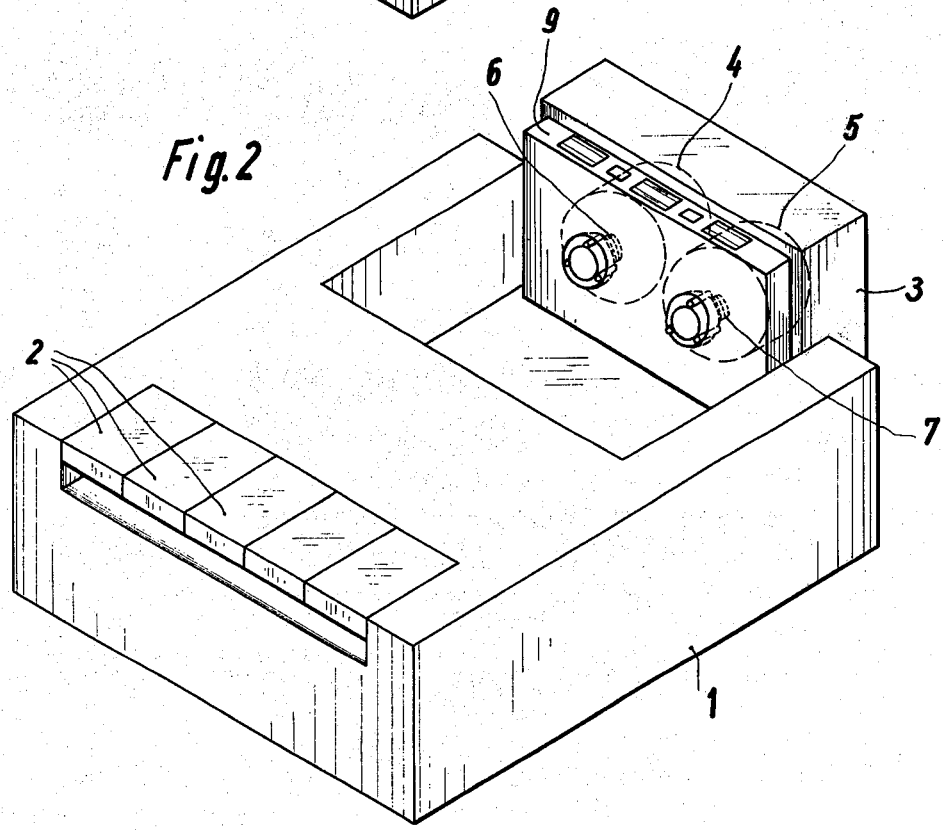

TAPE DRIVE

BRIEF SUMMARY OF THE INVENTION

The invention relates to a tape drive system for a cassette tape recording and/or reproducing apparatus.

Many tape recording and/or reproducing apparatuses have been proposed, which have from one to three electric drive motors. It has been found that generally the apparatus with three drive motors achieve more advantageous results, when the requirements made in respect of quality of sound recording and reproducing are high. There are several possible ways in which three motors can be arranged below the support plate on which the tape cassette is carried in the apparatus. When all three motors are arranged in one plane one beside the other, the outside diameter of the motors which can be used is relatively severely restricted, as the distances between the motor drive shafts are determined in particular by the generally standard sizes of the tape cassettes to be employed.

It is possible for one motor to be arranged in a laterally displaced position, in which case the drive shaft to be driven by that motor is connected to the motor by way of a belt. However, when the requirements made in respect of quality of sound recording and/or reproduction are high, very high requirements must also be made as regards the belt drive. It has been found difficult however to make the belt drive comply with the requirements set.

Another possibility is to arrange one motor at a lower level than the other two motors, and to provide that motor with a correspondingly longer drive shaft. However, it is generally difficult and expensive to achieve the necessary precision in the production of such shafts.

The present invention aims to a tape drive system wherein by novel constructional features and without appreciable additional expenditure, and therefore without any substantial increase of the production costs, a substantial improvement in the performance is achieved and wherein electric motors of conventional design may be used.

According to the present invention, there is provided a tape drive system for use in a tape recording and/or reproducing apparatus for a tape cassette having two tape spools one beside the other, comprising: a main housing; a movable casing portion connected to the main housing whereby a cassette-receiving space is provided between the main housing and the casing portion, the casing portion being displaceable relative to the main housing for exchanging a said cassette received in use in said space; tape winding motors for engaging the tape spools of a said cassette received in said space; at least one tape drive capstan; and at least one capstan drive motor driving the respective capstan to drive the tape, at least one of the motors being disposed in the casing portion for operatively engaging said received cassette from one side thereof, and the other motor or motors being disposed in the main housing for operatively engaging said received cassette from the other side thereof.

DESCRIPTION OF THE DRAWINGS

Embodiments of a tape drive system for a cassette tape recording and/or reproducing apparatus according to the present invention will now be described by way of example with reference to the accompanying drawings, in which like numerals designate like parts throughout the figures thereof, in which parts of the apparatus not necessary for comprehension of the invention are not shown.

FIG. 1 is a diagrammatic simplified perspective view of a first embodiment of the apparatus, in the closed or operational condition, FIG. 2 is a view similar to that of FIG. 1 but showing the apparatus in the opened condition, so that the tape cassette is visible and accessible.

Figure 3:
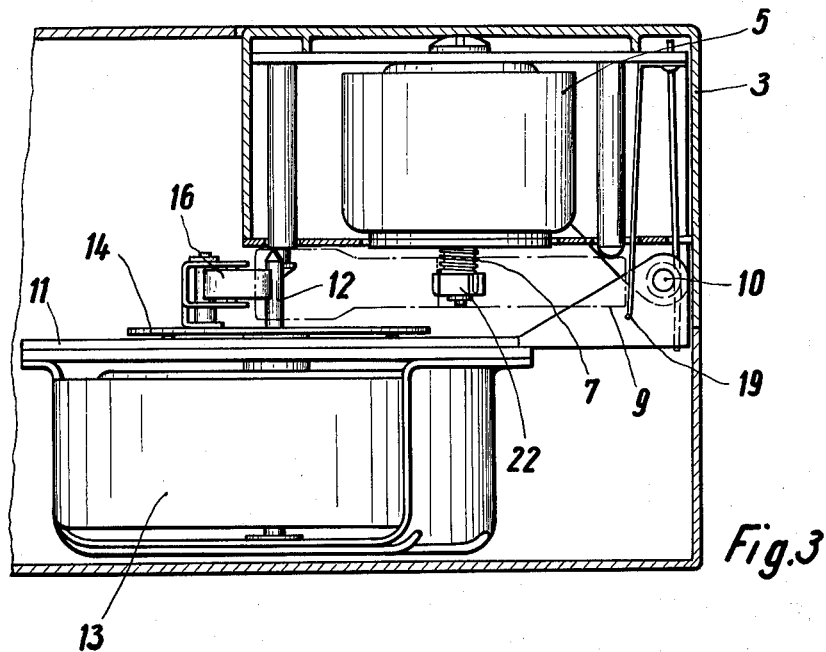
FIG. 3 is a view in cross-section through a portion of the FIG. 1 apparatus, showing the drive motors, with the apparatus in the operational or closed condition, as in FIG. 1.

Referring firstly to FIGS. 1 to 4, the tape recording and/or reproducing apparatus comprises a main housing or body portion 1 which is provided in its top surface at the front edge portion thereof, with a plurality of keys 2, there being five such keys as illustrated, for setting the apparatus into its various operating conditions, such as playback, rapid forward movement, return movement, and so on. Disposed at the rear part of the top surface of the main housing 1 is a movable casing portion 3. In this embodiment the portion 3 is connected by a hinge means (not visible in FIG. 2 but shown in FIGS. 3 and 4) to the housing 1, so as to be pivotable between the position of FIG. 1 and the position of FIG. 2. In its interior the portion 3 includes two electric drive motors 4 and 5 which are denoted by broken lines in FIG. 2. The motors 4 and 5 are winding motors to drive winding hubs or mandrels 6 and 7 which are arranged co-axially with respect to the respective motors. The hubs 6 and 7 engage respective winding plates (not shown) forming parts of the tape spools, which are arranged one beside the other, within a tape cassette 9, when the cassette is inserted into position on the apparatus.

Figure 4:
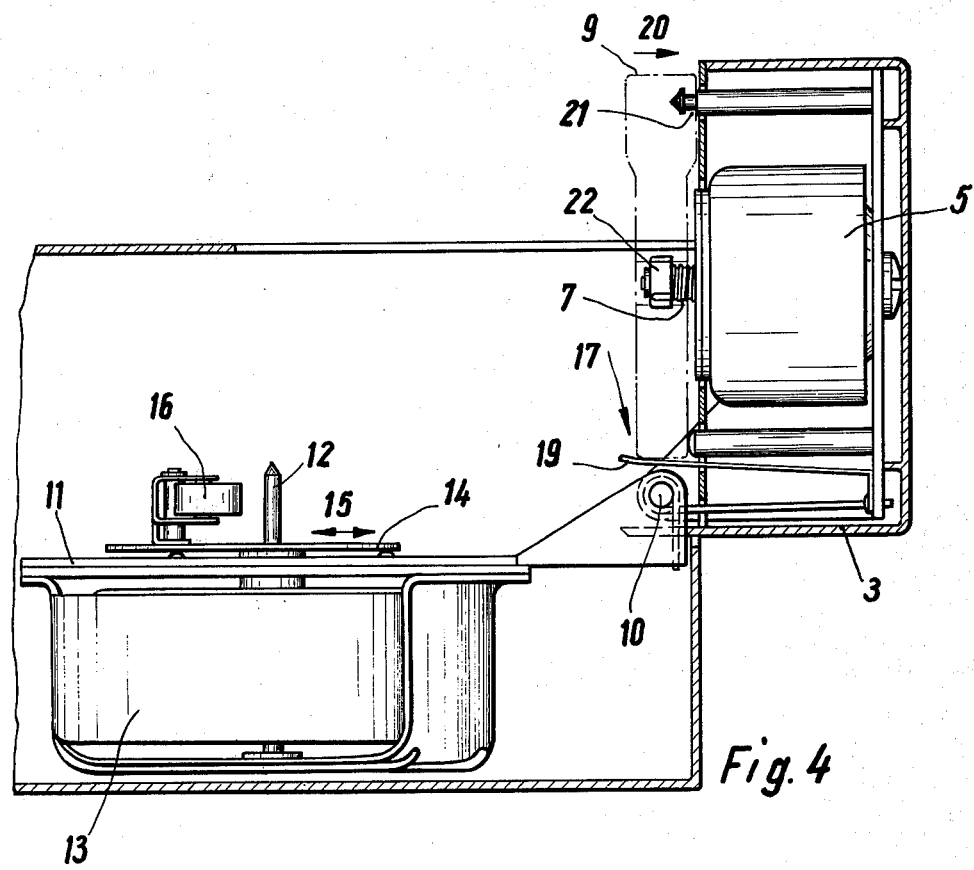
FIG. 4 is a view corresponding to FIG. 3 but showing the apparatus in the opened condition, as in FIG. 2.

FIGS. 3 and 4 show more clearly the arrangement of the various motors of the apparatus, and the winding hubs 6 and 7. The portion 3 is mounted on the housing 1 by means of the hinge means or linkage 10. The hinge means 10 is supported on a plate 11, to the underside of which is secured an electric drive motor 13 for driving a tape drive capstan 12. The capstan may be formed by an end portion of the drive shaft itself of the motor 13. A sound heat-carrier platform 14 is carried on the top surface of the plate 11, and is displaceable in the directions indicated by the arrow 15 in FIG. 4. A sound recording and/or reproducing head (not shown) and an erase head (also not shown) are mounted on the platform 14. Also secured on the platform 14 is a pivotally mounted pressure or pinch roller 16 which is operable under the action of a spring to press the tape against the capstan 12, when the cassette is fitted into place, that is to say, when the recorder is in the condition of ready for operation, as in FIG. 3.

When the portion 3 is in the opened condition of FIG. 4, the cassette 9 is fitted into place by movement in the direction indicated by arrow 17, at the same time pressing the spring 19 downwardly. Then, the upper end of the cassette 9 is pressed in the direction indicated by the arrow 20 onto one or more retaining pins (not referenced) with groove 21, until the edge of the cassette is brought into snap engagement with the groove 21.

When this is done, at the same time each of the winding plates of the cassette tape spools is brought into engagement wit the suitable shaped end portion 22 of the respective winding hub 6 or 7. The portion 3 is now pivoted into the closed condition of FIG. 3, and the platform 14 is so displaced that the tape is pressed against the capstan 12. The apparatus is now ready for operation.

It will be noted that the portion 3 is a square-cornered casing with a flat top surface, whose base surface is only slightly greater in its dimensions that the length and breadth of the cassette, so that the portion 3 covers the cassette from above when in the closed condition. The housing 1 has a recess in its top surface, for receiving the portion 3 so that in the closed condition the top surface of the portion 3 is aligned with the top surface of the housing 1; the housing 1 has side limb portions which project upwardly beside the portion 3. The smooth line of the apparatus housing is advantageous aesthetically, as well as facilitating handling and transportation, since there are no troublesome projecting portions. It will also be noted that the pivot axis of the portion 3 lies in the plane of symmetry of the tape, when the cassette spools are engaged with the hubs 6 and 7 of the motors 4 and 5. The pivot axis is parallel to a plane passing through the axes of rotation of the motors 4 and 5.

Figure 5:
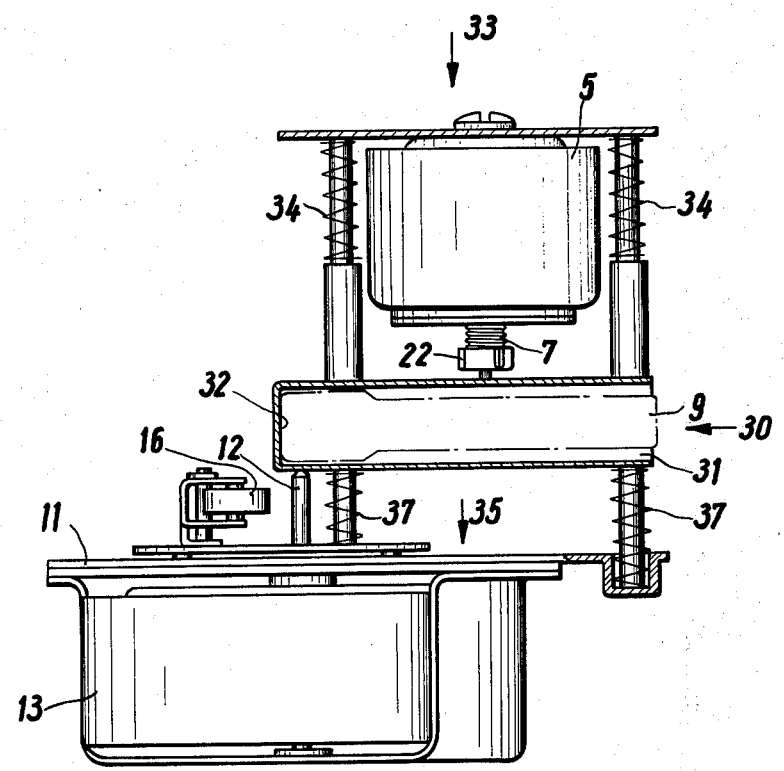
FIG. 5 is a diagrammatic view of part of a modified embodiment of the apparatus with a slit-shaped cassette-receiving guide and with linear displacement of motors and cassette relative to each other.

FIG. 5 shows another embodiment of the apparatus, illustrating the arrangement of the drive motors. This arrangement differs from the arrangement shown in FIGS. 1 to 4 primarily in that the motors 4 and 5 for driving the winding hubs 6 and 7 and thus the cassette tape spools are not carried by a casing portion 3 which is pivotally hinged on the plate 11, but the motors 4 and 5 and the cassette 9 are incorporated into a kind of linearly displaceable elevator mechanism.

The apparatus has a cassette-receiving assembly providing a slot 31 into which the cassette 9 is inserted in the direction indicated by arrow 30, until the front end 32 of the cassette comes into abutment against a closed end of the slot 31. The cassette-receiving assembly is carried displaceably on guide members (not referenced) while springs 34 are carried on the guide members above the cassette-receiving assembly. Further springs 37 are disposed on the guide members below the said assembly. When the cassette 9 is in position in the slot 31, a pressure is applied in the direction indicated by arrow 33, in a suitable manner, to cause the drive motors 4 and 5 to be displaced in the direction of their axes of rotation, towards the inserted cassette 9, against the action of the springs 34. As a result, the end portions 22 of the winding hubs 6 and 7 come into engagement with the respective winding plates of the tape spools of the cassette. In addition, both the motors 4 and 5 and the cassette 9 with associated components are displaced in the direction of the arrow 35 against the force of the springs 37, so that the capstan 12 engages into the interior of the cassette 9. This therefore provides that, for the purpose of playing the tape in the cassette 9, the tape is pressed against the capstan 12 by the roller 16. Alternatively, the capstan 12 can be moved upwardly, in the opposite direction to the direction of the arrow 35, against the force of the springs 37, so as to extend into the slot 31 which is then stationary, and into the cassette 9 in the slot 31.

It will be noted that the cassette-receiving assembly is arranged between the plate 11 and the support member (against which the springs 34 bear and to which the motors 4 and 5 are secured) which forms part of a linearly displaceable casing portion corresponding to the casing portion 3 of FIGS. 1 to 4. The said assembly is at a spacing from the hubs 6 and 7 and the capstan such that in the rest condition as illustrated the cassette 9 can be readily inserted into the slot 31, relative movement as between the motors 4 and 5, the capstan 12 and the cassette 9 causing the hubs 6 and 7 and the capstan to come into driving engagement with the cassette 9.

An arrangement similar to those described above can also be used in tape recording and/or reproducing apparatus with a so-called dual capstan drive. With this kind of drive, the tape is transported by two drive capstans, one of which is arranged upstream of the recording/reproducing head and the other of which is arranged downstream of the head. This form of drive can achieve a good degree of uniformity in the tape drive movement.

Figure 6:
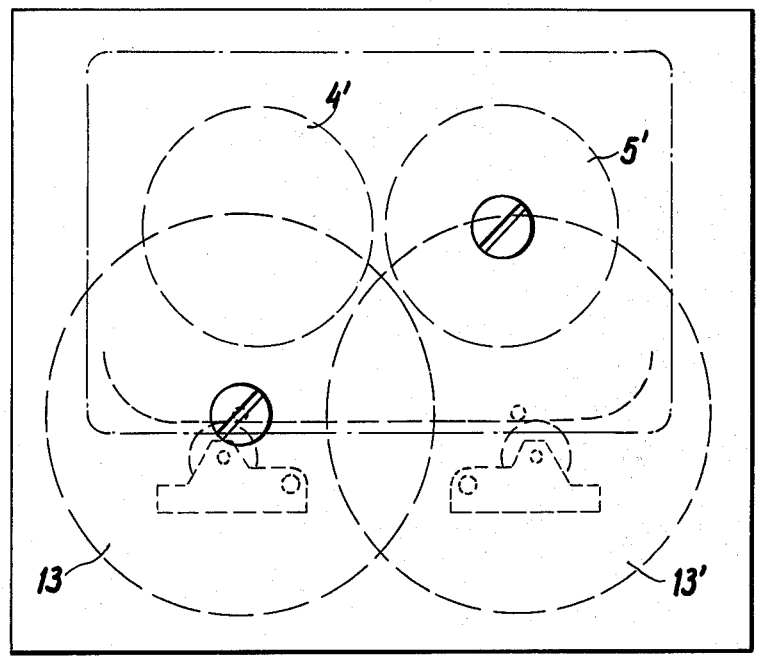
FIG. 6 is a diagrammatic simplified plan view of part of a further embodiment of the apparatus, having four drive motors, for dual-directional recording and/or reproducing apparatus with dual capstan drive.
Figure 7:
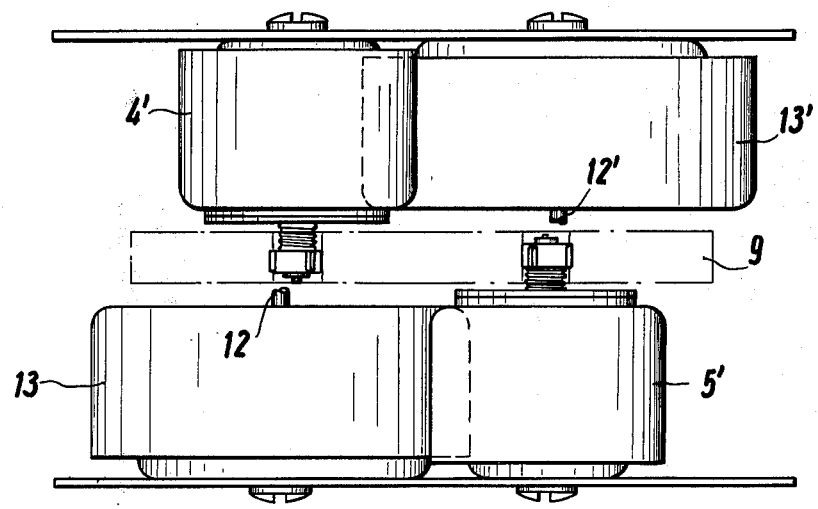
FIG. 7 is a rear side view of the motor arrangement of FIG. 6.

In the dual capstan drive apparatus of which FIG. 6 shows a plan view and FIG. 7 shows a rear side view, one spool winding motor 4' is arranged in the same fashion as in the above-described embodiments, that is, in a casing portion that is movable relative to the main housing of the apparatus, but the other winding motor 5' is arranged below the tape cassette 9, beside the electric tape capstan drive motor 13. A second electric motor 13' is provided for the second capstan of the drive, and serves to drive the second tape drive capstan 12'. The motor 13' is arranged above the cassette 9, laterally beside the winding motor 4', as is particularly clearly visible in FIG. 7. In this embodiment also, the motors 13 and 13' are arranged co-axially with respect to the associated capstans 12 and 12'.

The four drive shafts (two capstan drive shafts and two spool winding shafts) can be used for proper tensioning of the tape, to achieve uniformity of tape movement, so that it is no longer necessary to provide additional tape tensioning means, as are otherwise generally required.

It will be apparent that, with the above-described constructions, both the capstan or capstans and the two winding plates of the tape cassette are driven directly by way of the motor shafts, which can thus be short, and in addition, the arrangement of the motors is such that motors of conventional construction and size can be used, that is to say, there is no restriction to using motors of small outside diameter. Furthermore, since the capstan is driven directly, that is to say, without the interposition of belts or drive wheels, the tape is therefore moved with a high level of uniformity. Of further assistance in achieving this aim is the fact that the capstan, which is co-axial with its drive motor, is relatively short, in that a longer shaft or associated support bearing construction of substantial axial length would involve greater rotational tolerances and would thus result in poorer synchronisation of movement, assuming equal cost.

Many possible modifications will become apparent from the foregoing without departing from the spirit of the present invention. However, the foregoing disclosure is presented in an illustrative sense rather than a limiting sense and the appended claims are relied upon to define the scope of the present invention.

We claim:

1. A tape drive system for a recording and/or reproducing apparatus for a tape cassette having two tape spools one beside the other, comprising: a main housing; a movable casing portion connected to the main housing whereby a cassette-receiving space is provided between the main housing and the casing portion, the casing portion being displaceable relative to the main housing for exchanging a said cassette received in use in said space; tape winding motors for engaging the tape spools of a said cassette received in said space; at least one tape drive capstan; and at least one capstan drive motor driving the respective capstan to drive the tape, at least one of the motors being disposed in the casing portion for operatively engaging said received cassette from one side thereof, and the other motor or motors being disposed in the main housing for operatively engaging said received cassette from the other side thereof.

2. Apparatus according to claim 1 wherein said casing portion is pivotal relative to said main housing.

3. Apparatus according to claim 1 wherein said casing portion is linearly displaceable relative to said main housing.

4. Apparatus according to claim 1, wherein said tape winding motors are disposed in said casing portion.

5. Apparatus according to claim 2 including within said main housing a support plate on which said casing portion is pivoted and to which said at least one capstan drive motor is secured.

6. Apparatus according to claim 1, said casing portion being pivotal relative to said main housing and said tape winding motors being disposed in said casing portion, wherein the pivotal axis of the casing portion lies in the plane of symmetry of the tape, when said tape cassette is fitted into its position of driving engagement with said tape winding motors.

7. Apparatus according to claim 6 wherein said pivotal axis is parallel to a plane passing through the axes of the tape winding motors.

8. Apparatus according to claim 1 wherein said casing portion is a squared casing whose base surface is only slightly greater in its dimensions than the length and breadth of said tape cassette, whereby the casing covers the cassette when the casing portion is in its position for operation of the apparatus.

9. Apparatus according to claim 8 wherein said casing portion is in its said position for operation said casing portion is aligned with the surface of portions of the main housing which project beside said casing portion.

10. Apparatus according to claim 3 including a cassette-receiving assembly having a slot for receiving the cassette, the assembly being linearly movable substantially parallel to the axes of rotation of the winding motors and of said at least one capstan, the assembly being mounted at a spacing from winding hubs of the winding motors and said at least one capstan such that in a rest condition of the assembly a said cassette can be inserted into said slot, relative movement between the cassette-carrying assembly, the winding hubs and said at least one capstan, in the direction of the axes of the motors, bringing the winding hubs and said at least one capstan into engagement with the cassette from respective sides thereof.

11. Apparatus according to claim 1 and including two said tape drive capstans and two said capstan drive motors, wherein a respective capstan drive motor and a respective tape winding motor are provided in each side of the cassette-receiving space.

* * * * *